United States Patent
Stephan et al.

(10) Patent No.: US 7,258,406 B2
(45) Date of Patent: Aug. 21, 2007

(54) SUSPENSION DEVICE FOR LOWERABLE LUGGAGE COMPARTMENTS

(75) Inventors: Walter Alfred Stephan, St. Martin (AT); Hermann Filsegger, Ried im Innkreis (AT)

(73) Assignee: Fischer Advanced Composite Components AG, Ried im Innkreis (AT)

( * ) Notice: Subject to any disclaimer, the term of this patent is extended or adjusted under 35 U.S.C. 154(b) by 415 days.

(21) Appl. No.: 10/491,723

(22) PCT Filed: Sep. 23, 2002

(86) PCT No.: PCT/AT02/00275

§ 371 (c)(1),
(2), (4) Date: Apr. 5, 2004

(87) PCT Pub. No.: WO03/033346

PCT Pub. Date: Apr. 24, 2003

(65) Prior Publication Data

US 2004/0245897 A1 Dec. 9, 2004

(30) Foreign Application Priority Data

Oct. 17, 2001 (AT) .............................. A 1653/2001
Apr. 18, 2002 (AT) .............................. A 600/2002

(51) Int. Cl.
*A47F 5/08* (2006.01)
*B64D 11/00* (2006.01)

(52) U.S. Cl. .................................... 312/246; 244/118.5
(58) Field of Classification Search ................ 312/246, 312/247, 248, 319.1; 244/118.1, 118.5
See application file for complete search history.

(56) References Cited

U.S. PATENT DOCUMENTS

| 3,700,199 | A | * | 10/1972 | Matuska ................... 244/118.1 |
| 4,275,942 | A | * | 6/1981 | Steidl ......................... 312/266 |
| 5,244,269 | A | | 9/1993 | Harriehausen et al. |
| 5,383,628 | A | * | 1/1995 | Harriehausen et al. ... 244/118.1 |
| 5,441,218 | A | * | 8/1995 | Mueller et al. ........... 244/118.1 |
| 5,567,028 | A | * | 10/1996 | Lutovsky et al. ........... 312/246 |
| 5,842,668 | A | * | 12/1998 | Spencer ................... 244/118.1 |
| 5,934,615 | A | * | 8/1999 | Treichler et al. .......... 244/118.5 |
| 5,938,149 | A | * | 8/1999 | Terwesten ................. 244/118.5 |
| 6,045,204 | A | * | 4/2000 | Frazier et al. .............. 312/247 |
| 6,691,951 | B2 | * | 2/2004 | Frazier ..................... 244/118.1 |
| 2002/0175244 | A1 | * | 11/2002 | Burrows et al. .......... 244/118.1 |
| 2005/0224643 | A1 | * | 10/2005 | Graf et al. ............... 244/118.1 |

FOREIGN PATENT DOCUMENTS

| DE | 41 30 644 | 3/1993 |
| DE | 43 35 151 | 4/1995 |
| DE | 196 17 657 | 11/1997 |
| EP | 1 260 434 | 11/2002 |
| EP | 1 306 303 | 5/2003 |

* cited by examiner

Primary Examiner—Janet M. Wilkens
(74) Attorney, Agent, or Firm—Jacobson Holman PLLC

(57) ABSTRACT

A suspension device for a lowerable luggage stowage compartment has at least one spring element for assisting the movement of the compartment into a closed position against the force of gravity, and at least one damping element for damping the movement of the compartment into an opened position. A weight detector detects the weight of the compartment, and at least one additional spring element can be actuated based on the detected weight of the compartment. A retention device is provided for fixing the additional spring element. The suspension device provides a compartment that is easy to handle and easy to close even when fully loaded.

20 Claims, 10 Drawing Sheets

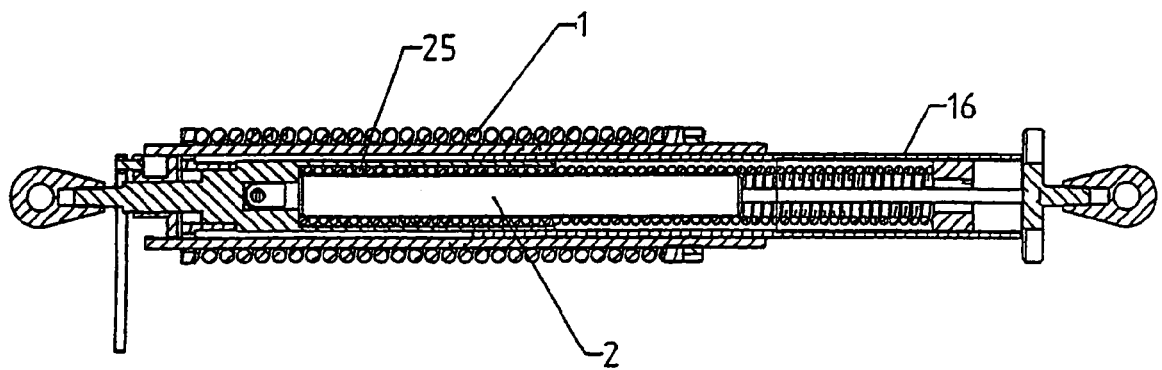
Fig. 11A
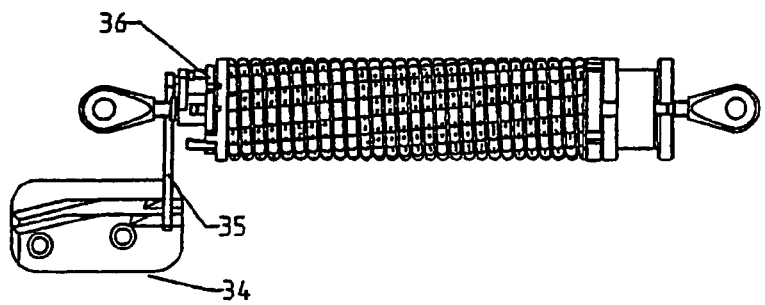 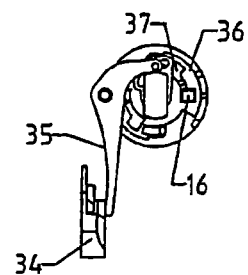
Fig. 11B        Fig. 11C

SUSPENSION DEVICE FOR LOWERABLE LUGGAGE COMPARTMENTS

This is a nationalization of PCT/AT02/00275 filed Sep. 23, 2002 and published in German.

BACKGROUND OF THE INVENTION

1. Field of Invention

The invention relates to a suspension device for lowerable luggage stowage compartments comprising at least one spring element for assisting the movement of the compartment into its closed position contrary to gravity, and at least one damping element for damping the movement of the compartment into its opened position, and comprising a means for detecting the weight of the compartment and at least one additional spring element capable of being activated or switched over in dependence on the detected weight of the compartment, a retention device being provided for fixing the at least one additional spring element.

Furthermore, the invention relates to a lowerable luggage stowage compartment comprising such a suspension device, wherein at least one spring element is arranged between the compartment and a stationary structural element laterally of the compartment so as to assist in the movement of the compartment into its closed position contrary to gravity, and at least one damping element is arranged for damping the movement of the compartment into its opened position, a means for detecting the weight of the compartment being connected to the compartment part.

The present invention mainly relates to a luggage stowage compartment as is used in passenger aircraft. However, it is also applicable to luggage stowage compartments as, e.g., used in rail-borne vehicles or in other transport devices adapted for passenger transportation.

2. Description of the Prior Art

Luggage stowage compartments in passenger aircraft usually consist of cases mounted above the passengers' heads and having an opening that is closable e.g. by means of a pivotable flap. To put an item of luggage into the compartment or to remove it therefrom, the passenger must open the flap and lift his/her item of luggage through the opening into the compartment or remove it therefrom. This requires a considerable effort, particularly if the items of luggage are heavy, and this may be an impediment for short or weak persons.

To improve the situation, particularly in very large passenger aircraft which also have a greater cabin height, luggage stowage compartments have been developed which can be pivoted downwards or lowered for the purpose of loading and unloading the same. Such pivoting or lowering mechanisms usually comprise at least one damping element which dampens the downward movement of the compartment so that the compartment will not drop down abruptly during opening of the latter and cannot cause injuries. In addition, such a mechanism comprises at least one spring element which assists the movement of the compartment contrary to gravity into its closed position and thus makes it easier for the passenger to close the loaded compartment. These damping and spring elements are adjusted such that they will provide a sufficient damping for a luggage stowage compartment bearing an average load, and will sufficiently assist the movement into its closed position. If the load of the compartment deviates from this average value to which the damping and spring elements have been adjusted, the mechanism will not function as desired. Thus, an empty compartment would be only very difficult to be moved into its open position, contrary to the action of the damping element, allowing an opening of the compartment only by exerting a relatively high tensile force. On the other hand, it would be difficult and possible only by using physical activity to move an overloaded compartment into its closed position contrary to gravity. The problem is aggravated by the fact that for future aircraft designed for ever increasing numbers of passengers, the luggage stowage containes have to be built of increasingly larger sizes and have to withstand ever increasing loads. Such luggage stowage compartments may, e.g., be designed for loads of from 0 to 60 kg. Accordingly, it is nearly impossible to design a pivoting or lowering mechanism for such a luggage stowage compartment which will be the best for all loads.

DE 41 30 644 A1 shows an overhead luggage stowage device whose handling will require little actuation effort and which is largely independent of the load added and the position of the movable compartment. For this purpose, the gas spring provided to assist the closing procedure is pivotably arranged so that the hinge point on the upper lever and, thus, the torque acting on the upper lever thereby assisting the closing procedure of the compartment are changeable. The weight of the movable compartment of the overhead luggage stowage device is detected by a weighing pin which acts on a weighing lever connected to the spring element. Depending on the weight of the compartment's load, the gas spring will be pivoted more or less, and thereby the weight force of the compartment will be compensated. To prevent the gas spring from being pivotable into its original position during the closing procedure of the compartment, a blocking means is provided which is actuated via a Bowden cable as soon as a pressure is exerted on the arresting plate at the lower side of the pivotable compartment so as to initiate the switching procedure. In addition, when a certain height of the lowerable compartment has been reached, the blocking device is automatically actuated so that it will also be active independently of the state of the Bowden cable.

DE 43 35 151 A1 also shows an overhead luggage stowage device comprising a lowerable compartment wherein a further spring element can be activated in dependence on the loading of the compartment so as to assist in the closing procedure. If the compartment is not loaded or only slightly loaded, a supporting lever connected to the additional spring element is blocked so that the additional spring element will not exert an additional force on the compartment. If the load of the compartment exceeds a certain limiting value which is detected by the load-caused deflection of the movable compartment, the blocking of the supporting lever can be released by an active pressure from the bottom on a triggering plate on the movable compartment part, and the additional spring element will act to assist in the closing procedure. Between the triggering plate and the supporting lever, a Bowden cable is arranged to transmit the pressure onto the triggering plate on the blocking hook. Therefore, an active participation of the passenger is of necessity required for an activation of the supporting spring, and this renders an operation thereof difficult. The connection between the triggering plate and the blocking hook of the supporting gas spring required of necessity also makes mounting and maintenance more complex and makes it more susceptible to failure.

SUMMARY OF THE INVENTION

Therefore, it is an object of the present invention to provide a suspension device for lowerable luggage stowage compartments which will assist in the lifting of the compartment into its closed position also with the compartment being variably loaded, and which simultaneously will sufficiently dampen the movement during opening of the compartment with the compartment being variably loaded. For instance, the force required for opening the compartment in its empty state should not exceed 70 N, and the force required for closing the fully loaded compartment should not exceed 200 N. Moreover, the suspension device should be designed to be as simple, light-weight, and robust as possible, as well as maintenance-free. Furthermore, the suspension device shall ensure an easy manipulation of the lowerable luggage stowage compartment. The weight-caused activation or switching over of the at least one additional spring element shall occur automatically and without active participation by the passenger. Such a suspension device shall, e.g., withstand the stress usual and stipulated in the aircraft industry. For instance, for the actuation of such luggage stowage compartments a product life of 200,000 opening cycles is required.

A further object of the invention consists in providing a lowerable luggage stowage compartment which is easy to handle also for variable loads and which is constructed as simple, light-weight and robust as possible and, moreover, can be produced at low costs and is maintenance-free.

The first object according to the invention is achieved in that the retention device is actuatable by the means for detecting the weight of the compartment. The present invention is characterised by a direct connection between the means for detecting the compartment weight and the retention device so that if a certain weight is exceeded, one or more additional spring elements can automatically be activated or switched over, respectively. The invention is characterised by low mounting expenditures, a low amount of maintenance and a low failure rate. With this construction, a two- or multi-stage control of the spring force can be realized. As a rule, a two-stage control of the spring force will suffice for a flawless functioning of the handling of the compartment. The value of the compartment weight starting from which the additional spring element will be activated is chosen according to the respective requirements and, e.g., will be determined to be half the maximum allowable load. In case of compartment loads exceeding this limit value, the at least one additional spring element will assist in the lifting of the loaded compartment and thus will ensure an optimum handling. Thereby, an optimum handling of the lowerable luggage stowage compartment will be ensured also for varying loads.

To achieve the robustness required, the spring element as well as the at least one additional spring element are formed by mechanical coil springs which preferably are arranged coaxially to each other. Thus, a serial connection of at least two spring elements is formed which, due to the coaxial arrangement, have the same point of application and point of action. Of course, also a parallel arrangement of several spring elements is feasible. Moreover, coil springs arranged coaxially to each other are particularly space-saving and compact.

According to a further feature of the invention it is provided that the at least one additional spring element is surrounded by a sleeve which is fixable by a retention device so that the at least one additional spring element can be fixed when in its tensioned position. Thus, if the compartment is empty or if its load is below the limiting value, the at least one additional spring force of a spring element will be stored and released upon demand by actuation of the retention device.

The retention device may, e.g., be formed by a movable hook or the like, engaging, e.g., in a flange on the sleeve, thereby fixing the latter and the spring arranged therebelow in its tensioned position.

Alternatively, the retention device may also be formed by a rotatably mounted disk, wherein the rotation of the disk can be influenced by the detected weight of the compartment and by this the at least one additional spring element can be activated. By the rotatably mounted disk, the at least one additional spring element can be locked if the compartment weight is below a certain limiting value, and released, if the weight of the compartment is above a certain limiting value. If several additional spring elements are arranged, the activation of individual ones of the additional spring elements or of combinations thereof can be achieved by a respective rotation of the disk.

If the disk is non-rotationally connected to a switching lever and a switching link having at least two different switching positions that can be influenced by the weight of the compartment is arranged on the compartment, with the switching lever resting on the switching link, an activation or switching over of the at least one additional spring element can be effected in dependence on the weight. The switching link will force the switching lever into an appropriate position, whereby the disk that is non-rotationally connected to the switching lever will assume an appropriate position so that the at least one additional spring element will be released or blocked in accordance with the weight of the compartment.

To achieve an exact activation of the at least one spring element, the switching lever preferably is pressed against the switching link by means of a spring or the like. This may be effected by a torsion spring, e.g.

A simple realisation of the switching link is provided by at least two snap-in steps having different step depths, which switching link, in the opened position of the compartment, is displaceable by the weight of the latter. The maximum displacement of the compartment will determine the displacement of the switching link which will be subdivided depending on the number of switching steps. Usually, two switching steps will suffice, wherein in one switching position an additional spring element will be blocked and in the other switching position it will be released.

According to a further feature of the invention it is provided that the means for detecting the weight of the compartment is formed by a bearing of the compartment in its open position, which bearing can be deflected against a measurement spring. This purely mechanical construction is characterized by being particularly simple and robust. In this case, the compartment weight need not be continuously detected, it only has to be detected if a certain limiting value is exceeded. The measurement spring is dimensioned such that it can be stretched by a given deflection if the compartment is loaded in excess of the pre-determined measurement value.

The bearing can also be formed by an element connected to the compartment, which element, e.g. a pin, is arranged in a guide, e.g. a long hole, and is connected to the end of the measurement spring. By means of the long hole, the deflection of the compartment is limited.

If the element connected to the compartment is connected to one end of the Bowden cable or the like, whose other end is connected to the retention device of the at least one additional spring element so that the retention device is releasable if the compartment is deflected due to its weight, a simple, weight-controlled change of the spring force can be realized in a purely mechanical way. This is a robust and simple possibility of realizing the connection of the means for weight detection and the device for changing the spring force of the spring element.

To allow for an adjustment of the lowering device to the respective requirements, the limiting value of the compartment weight preferably is adjustable by an adjustable embodiment of the measurement spring. By this adjustability, also any possible signs of fatigue of the device for measuring the weight of the luggage stowage compartment can be counteracted. The adjustability of the measurement spring can be effected by changing the range of the spring or by other methods.

If a device for changing the spring force of the spring element and/or of the at least one additional spring element is provided, an adaptation to the respective requirements, such as, e.g., to the empty weight of the compartment, or also a re-adjustment of the spring elements can be effected.

In this case, the device for changing the spring force of the spring element and/or of the at least one additional spring element can be formed by a screw for changing the bias of the spring element and/or of the at least one additional spring element. In mechanical coil springs, the range of the spring and thus, the bias of the spring is adjusted by re-adjusting the screw.

According to a further feature of the invention, a device for maintaining the compartment in its opened position is provided, which may, e.g., be formed by a resiliently mounted sphere which engages in a corresponding snap-in depression when the compartment is in its opened position. By this, the compartment can suitably be kept in its opened position for loading and unloading, and thus, it can be manipulated more easily. In this case, the holding device must be appropriately positioned and the spring force which presses the sphere into the snap-in depression must at least be so high that it cannot be overcome by the force of the spring element.

Likewise, the means for detecting the weight of the compartment can be formed by an electronic sensor which detects the instantaneous weight of the luggage stowage compartment. Of course, such an electronic sensor also requires a voltage supply and the connecting lines required therefor, which are disadvantageous in contrast to the purely mechanical solution.

Likewise, the device for changing the spring force of the spring element can also be formed by an electronic element, e.g. an electric servo-motor or the like, which can infinitely vary the spring force of the spring element. Yet, also this realization has disadvantages when compared to a simple, mechanical construction, with regard to robustness and freedom from maintenance, and also in terms of costs and weight.

The second object according to the invention is achieved by a lowerable luggage stowage compartment of the indicated type in which the means for detecting the weight of the compartment is connected to a means for changing the spring force of the spring element.

Advantageously, on either side of the compartment at least one guide rod is rotatably arranged which is hinged to the stationary structural element, and furthermore, an element is arranged for synchronising the movement of the guide rods on both sides of the compartment. By this, a synchronous movement of the compartment is achieved during the lowering procedure, and thus twistings or uneven loads acting on the suspension device are avoided.

In the simplest form, the synchronising element may be formed by a non-rotational tube or the like connected to the guide rods on either side of the compartment.

To dampen also the closing procedure of the luggage stowage compartment, a further damping means may be provided for damping the movement of the compartment into its closed position.

The invention will be explained in more detail by way of the accompanying drawings which show an exemplary embodiment of the invention.

BRIEF DESCRIPTION OF THE DRAWINGS

Therein,

FIGS. 11A, 11B, and 11C show an embodiment of the spring element with a coaxially arranged additional spring element, when only the additional spring element is activated, in side view in a sectional representation of the spring element, and in a view on the retention device designed as a disk, and including the switching lever;

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
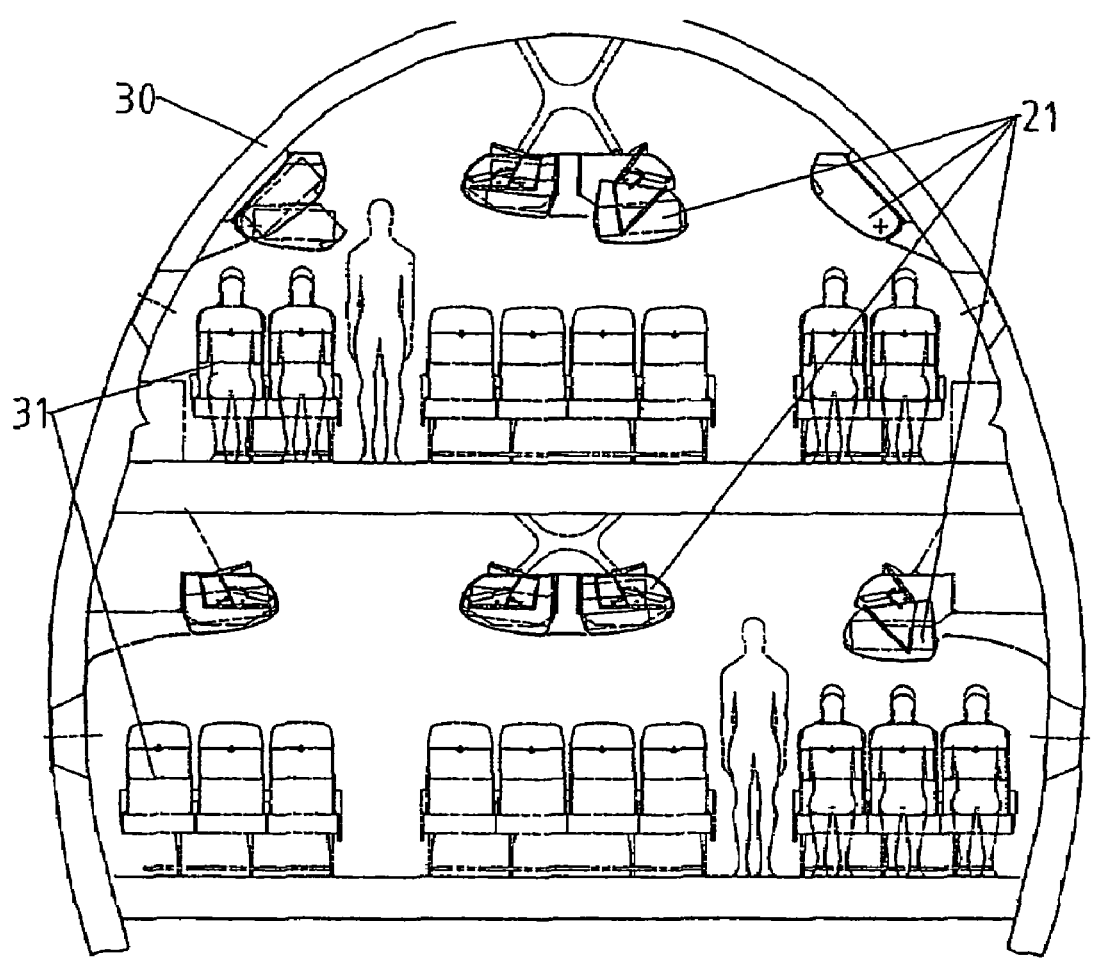
FIG. 1 shows a section through part of the fuselage of a passenger aircraft.

FIG. 1 shows a section through a part of the aircraft fuselage 30, in which the seats 31 for the passengers are arranged. Above the seats 31, there are the luggage stowage compartments 21, which may also be pivotably or lowerably arranged for greater ease of loading and unloading.

Figure 2:
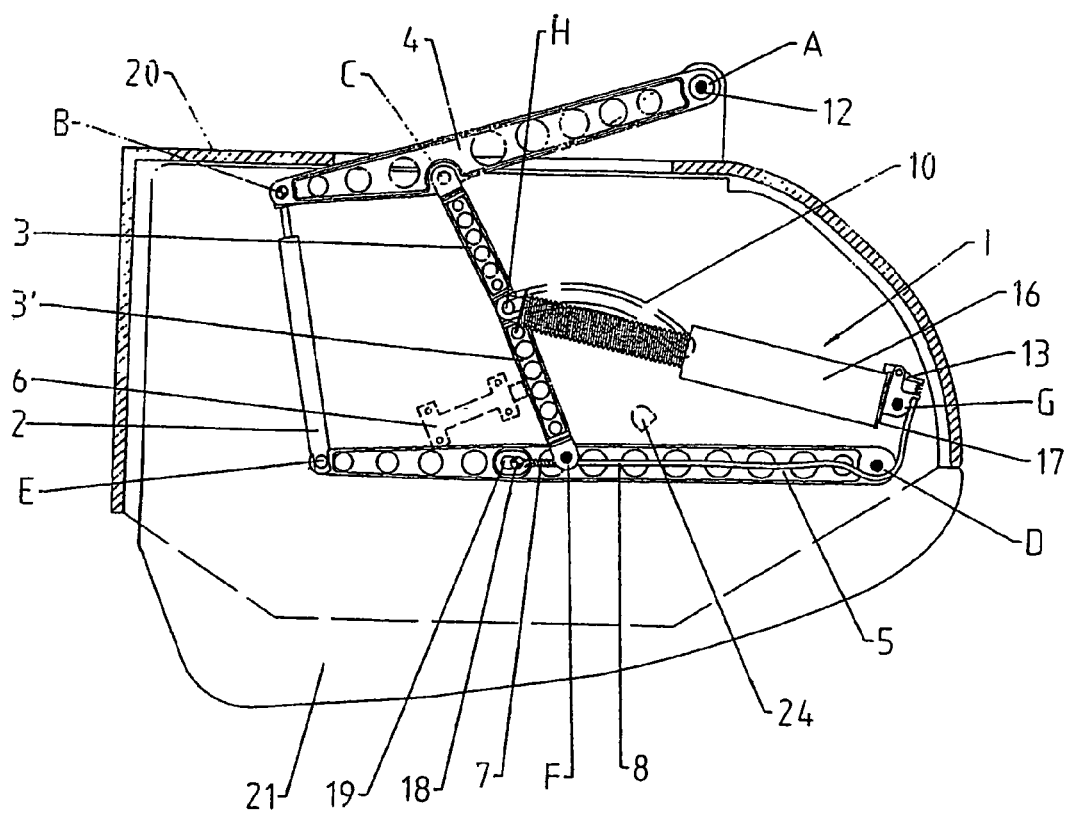
FIG. 2 shows an embodiment of a lowerable luggage stowage compartment in its closed position, in side view.

FIG. 2 shows a lowerable luggage stowage compartment 21 which is equipped with the suspension device according to the invention. Via the suspension device, the compartment 21 is connected to the stationary structural element 20 which may, e.g., be connected to the fuselage of an aircraft or the like. Preferably, the lowerable compartment 21 is designed like a trough. The suspension device preferably is arranged on both sides of the compartment, between the structural element 20 and a side wall of the compartment 21. The suspension device consists, e.g., of an upper guide rod 4 and a lower guide rod 5. With one of its ends (pivot point A), the upper guide rod 4 is mounted on the structural element 20 or on an element connected thereto, and with its other end (pivot point B) it is rotatably fastened to the compartment 21. With one of its ends (pivot point D), the lower guide rod 5 is connected to the structural element 20, and, via a damping element 2, its other end (pivot point E) is connected to the end of the upper guide rod 4 that is connected to the compartment 21. At the pivot point C of the upper guide rod 4, a part 3 of a toggle lever is hinged at whose end the spring element 1 engages at pivot point H. At its other end, at pivot point G, the spring element 1 is connected to the structural element 20. The one end of the toggle lever 3 is articulately connected to the further part 3' of the toggle lever at pivot point H, whose other end, at pivot point F, is articulately connected to the compartment 21. Toggle lever part 3' causes guiding of the suspension device during lowering of the compartment 21. In addition, a guiding link 10 may be arranged, e.g. in a wall connected to the structural element 20, which guiding link 10 obviates a lateral deflection during the movement of the luggage stowage compartment 21. The guiding link 10 is configured according to the movement of the end of the spring element 1. To dampen the movement during closing of the luggage stowage compartment 21, an additional damping means 6 may be arranged which, e.g., acts on the lower toggle lever part 3' and dampens the movement of the compartment 21 shortly before the latter is closed. The damping means 6 is arranged on structural element 20. The damping means 6 may also act on another movable part of the suspension device. The spring element 1, e.g., is formed by a coil spring 14 which is arranged on a rod 15 so as to prevent a lateral deflection. Over coil spring 14, a sleeve 16 is arranged which has a flange 17 via which sleeve 16 is held in the position illustrated by means of a hook 13. According to the invention, a means for detecting the weight of the compartment 21 is arranged on the compartment 21. In the exemplary embodiment illustrated, a pin 18 is connected to the side wall of the compartment 21, the pin projecting through a long hole 19 in the lower guide rod 5. On the pin 18, a measurement spring 7 is fastened against which a deflection of the compartment 21 in its opened position is possible. The deflection of the compartment 21 is transmitted via a Bowden cable 8 to the hook 13, whereby a change in the spring force of spring element 1 can be achieved in dependence on the weight of the compartment 21. The function of the means for detecting the weight of the compartment 21 and of the device for changing the spring force of the spring element 1 will be discussed in more detail further below. Usually the suspension means are arranged in mirror-inverted relationship on either side of the luggage stowage compartment 21. A synchronisation of the movement may, e.g., be achieved via a tube 12 or the like that is non-rotationally connected to the upper guide rods 4.

Figure 3:
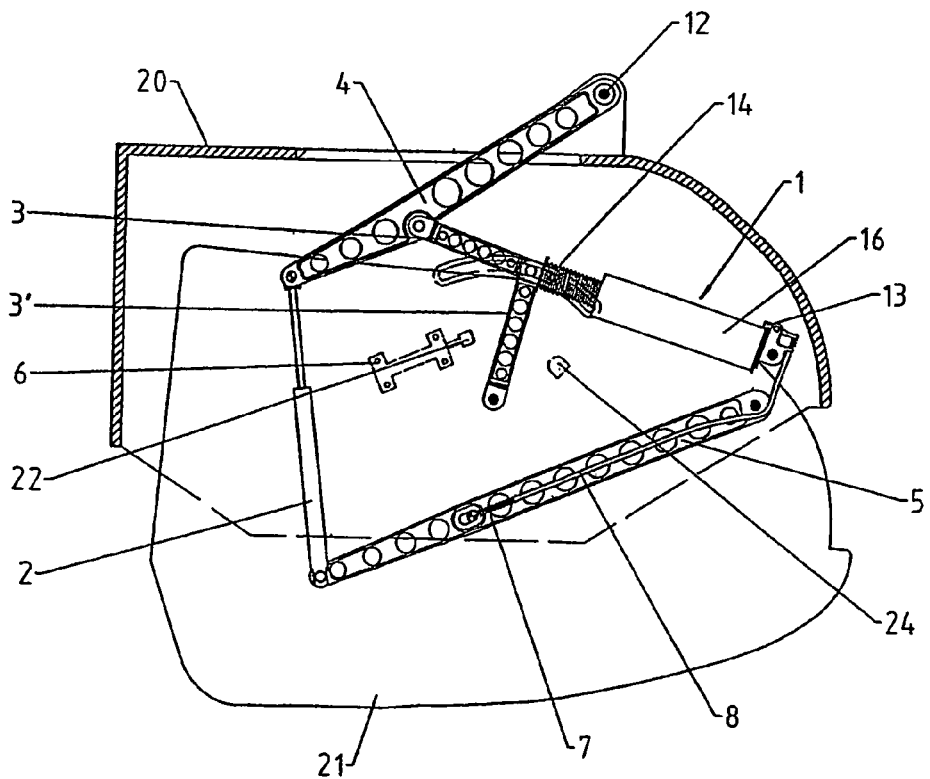
FIG. 3 shows the luggage stowage compartment according to FIG. 2 in partially opened position.

FIG. 3 shows the luggage stowage compartment 21 in partially opened position, wherein the compartment 21 is downwardly lowered, dampened by the damping means 2. The lower toggle lever part 3' is pivoted out of its original position about pivot point F so that the piston 22 of the damping means 6 is extended into its relaxed at-rest position.

Figure 4:
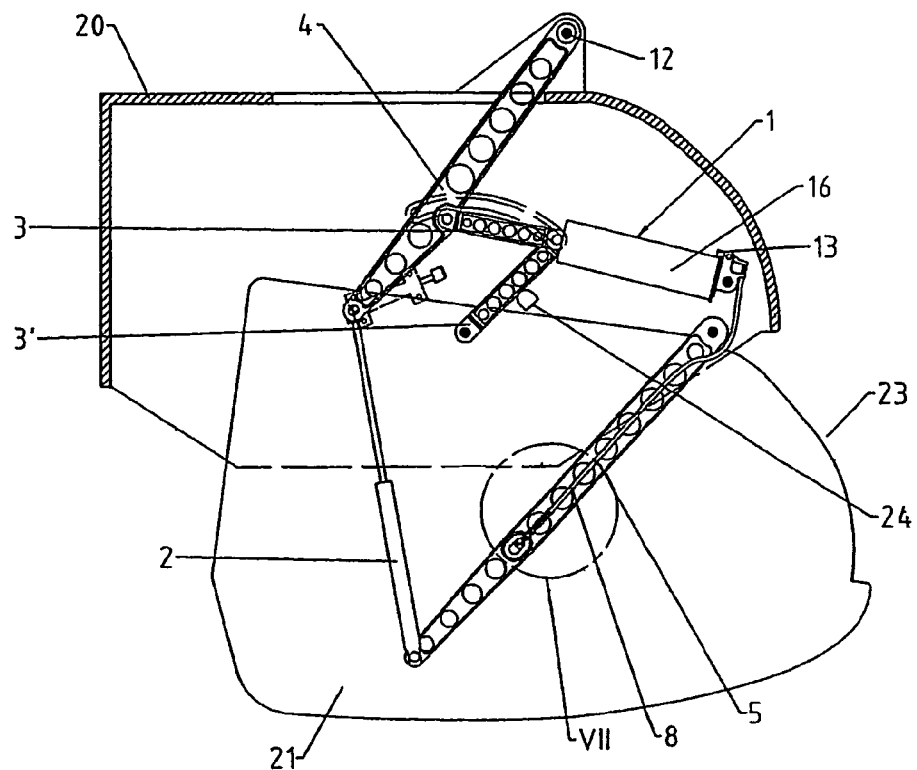
FIG. 4 shows the luggage stowage compartment according to FIG. 2 in its opened position.
Figure 5:
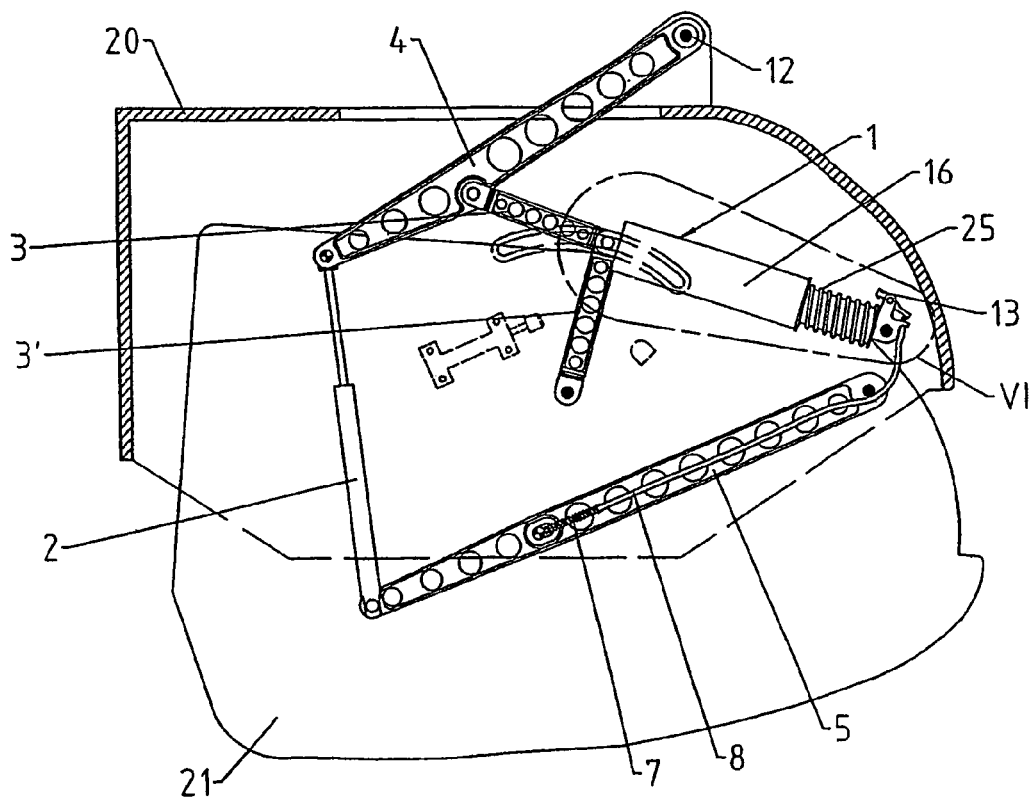
FIG. 5 shows the luggage stowage compartment when loaded beyond a given limiting value, with the additional spring element activated.
Figure 7:
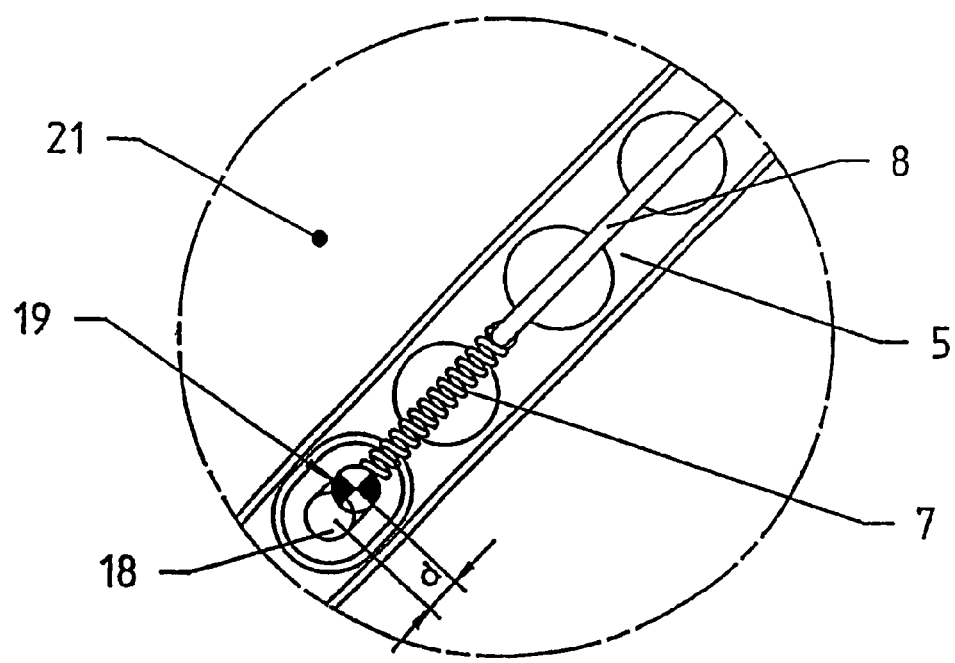
FIG. 7 shows the detail VII of FIG. 4, in an enlarged representation.

FIG. 4 now shows the lowerable luggage stowage compartment in its opened position, in which the luggage comfortably can be loaded and unloaded via the opening 23 of the compartment 21. In the opened position, the spring element 1 is completely compressed so that the spring force can exert its force when lifting the compartment 21. In the illustrated opened position of the compartment 21, the lower toggle lever part 3' can abut on an end stop 24 which delimits its movement. The end stop 24 may also be arranged at another point of the structural element 20 and act on another element of the suspension device. Now, when the compartment 21 is loaded with items of luggage, the inventive means for detecting the weight of the compartment 21 will become active. In this context, reference is made to FIG. 7 which shows the detail VII of FIG. 4 in an enlarged illustration. Due to the weight of the items of luggage, the compartment 21 will sink downwards contrary to the spring force of the measurement spring 7, the movement (distance d) being delimited by the long hole 19 in the lower guide rod 5. Via the spring force of the measurement spring 7, the limiting value of the weight of the compartment 21 can be adjusted starting from which a change of the spring force of the spring element 1 shall occur. The measurement spring 7 may, e.g. be adjusted via a change of the spring range, e.g. via a screw (not illustrated). To the pin 18 which projects through the long hole 19, a Bowden cable 8 is connected which transmits the deflection of the compartment 21 to the hook 13 that retains (keeps back) the sleeve 16 of the spring element 1. This state is illustrated in FIG. 5, in which the compartment 21 is lifted, whereby the spring element 1 exerts an increased spring force as a consequence of the activation of an additional spring element 25. By the weight of the compartment 21, the hook 13 has been moved and the sleeve 16 has been released so that the biased further spring element 25 arranged below sleeve 15 is released. By this, the additional spring element 25 which, e.g., is also formed by a coil spring, can exert its force in addition to the coil spring 14 of the spring element 1. By this, the movement of the compartment 21 into its closed position is assisted even when fully loaded. If the luggage stowage compartment 21 is opened again and unloaded, the compartment 21 will lift upwards, and hook 13 again will retain the sleeve 16 of the spring element 1 so that the force of coil spring 25 is not effective and merely the force of coil spring 14 is active which suffices to assist in the lifting procedure of the empty or only slightly loaded compartment 21.

Figure 6:
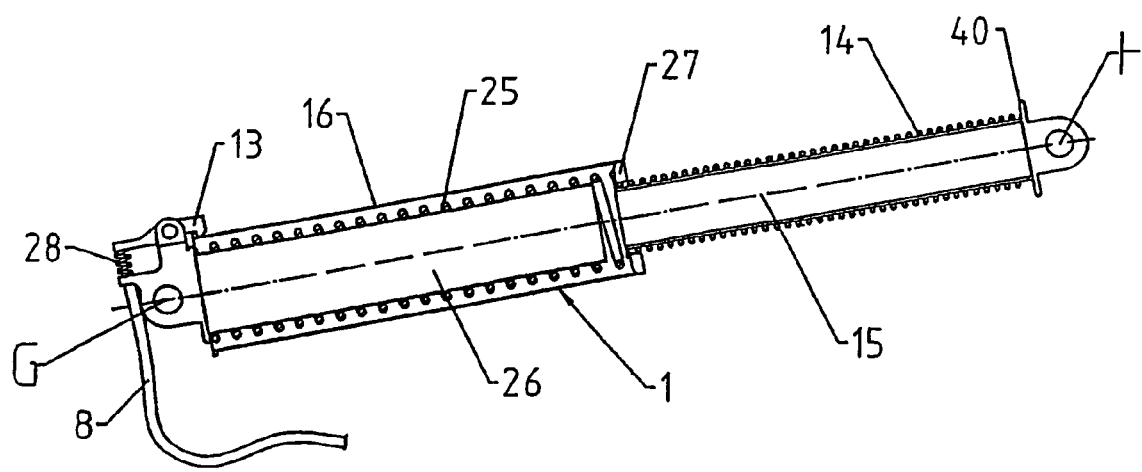
FIG. 6 shows the detail VI of FIG. 5, in an enlarged representation.

One embodiment of the spring element 1 according to the invention is represented in FIG. 6, which shows the detail VI of FIG. 5 in a sectional illustration. The spring element 1 consists of a coil spring 14 which is arranged over a rod 15. The one end of the spring element 1 is connected to the structural element 20 at pivot point G, while the other end of the spring element 1 is connected to the compartment 21 via pivot point H. Thus, the coil spring 14 exerts a force from pivot point G in the direction of pivot point H. A sleeve 26 is arranged over the coil spring 14, which sleeve has a length corresponding to the stroke of the spring element 1. Above sleeve 26, the additional coil spring 25 is arranged which is covered by sleeve 16. The coil spring 25 is maintained in compressed state by the end 27 of sleeve 16 as long as the hook 13 retains the sleeve 16 via flange 17. After actuation of the hook 13, the sleeve 16 is pressed against the end of the spring element 1, and the coil spring 25 can unfold its force in the direction of the pivot point H. To prevent the end 27 of sleeve 16 from moving beyond pivot point H, an enlarged flange 40 is arranged on rod 15. When opening the luggage stowage compartment 21, the spring element 1 is compressed, whereupon the flange 17 of sleeve 16 will again be pressed behind the hook 13 which, in case of an empty or slightly loaded compartment 21, will again retain the sleeve 16. For this purpose, the hook 13 must be biased, e.g. by means of a coil spring 28. Even though the illustrated coaxial, two-step arrangement of the spring element 1 has advantages, also a parallel arrangement of two or more spring elements may serve to achieve the object according to the invention.

Figure 8:
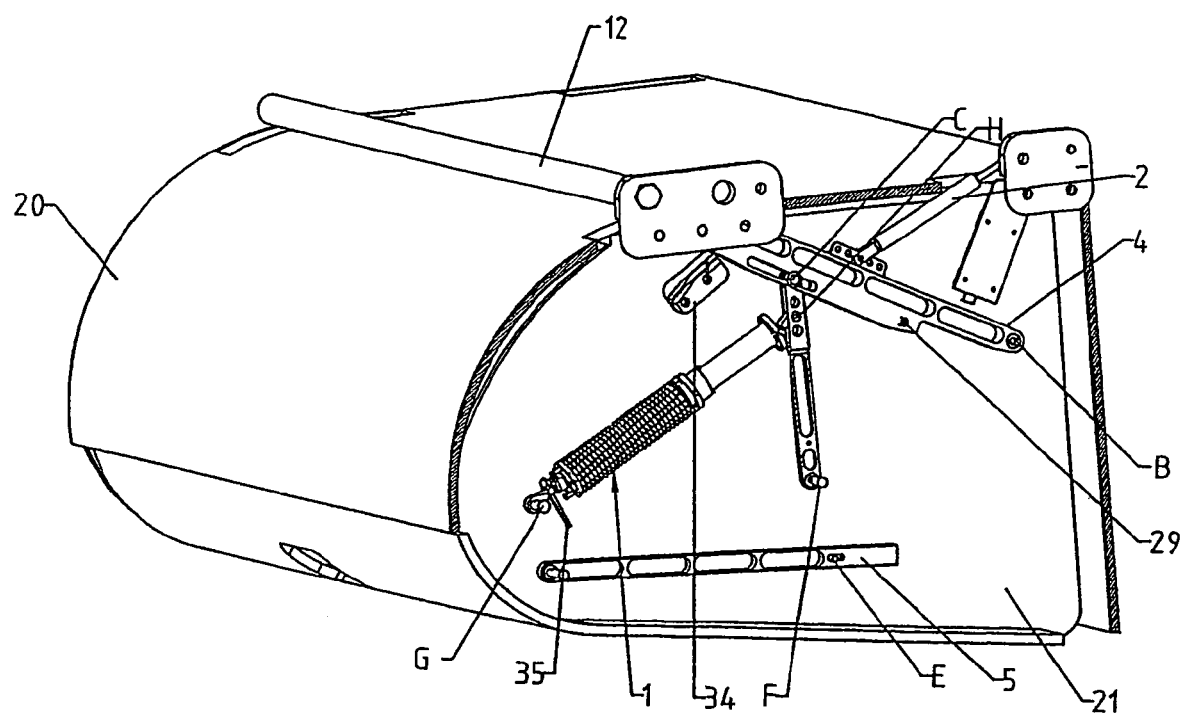
FIG. 8 shows a further embodiment of a lowerable luggage stowage compartment in its closed position, in a perspective view.

FIG. 8 shows a perspective view of a further embodiment of the overhead luggage stowage compartment 21 in its closed position. There, the stationary structural element 20 has been illustrated without side walls for a better view on the suspension device. In this alternative embodiment, the damping element 2 is connected between the upper guide rod 4 and an element for connection to the fuselage of the aircraft or the like. Just as in the embodiment according to FIGS. 2 to 5, the suspension device consists of an upper guide rod 4 and a lower guide rod 5, with a damping element 2 arranged between the ends thereof (pivot points D and E). In contrast to the embodiment according to FIGS. 2 to 5, not a toggle lever is arranged at the pivot point C of the upper guide rod 4, but rather a rigid lever 29 whose other end is articulately connected at pivot point F to the side wall 33 of the stationary structural element 20. At pivot point H of the lever 29, the one end of the spring element 1 engages which, with its other end, is connected at pivot point G to the side wall 33 of the structural element 20. According to the invention, a switching link 34 is arranged at the side wall of the compartment 21, which switching link, in the opened position of the luggage stowage compartment 21 according to FIG. 9, cooperates with a switching lever 35 of the spring element 1 and causes switching of the spring element 1 in dependence on the weight of the compartment 21. For this purpose, the movable compartment 21 in its opened position is arranged to be displaceable in its position against the spring force of a measurement spring, whereby the weight of the compartment 21 can be detected. According to FIG. 7, the displaceability of the compartment 21 in dependence on the weight of its load can be effected by movement of a pin 18 in a long hole 13 of the guide rod 5. The weight-caused change of the position of the compartment 21 within predetermined limits may, however, also be realized in a different manner.

Figure 9:
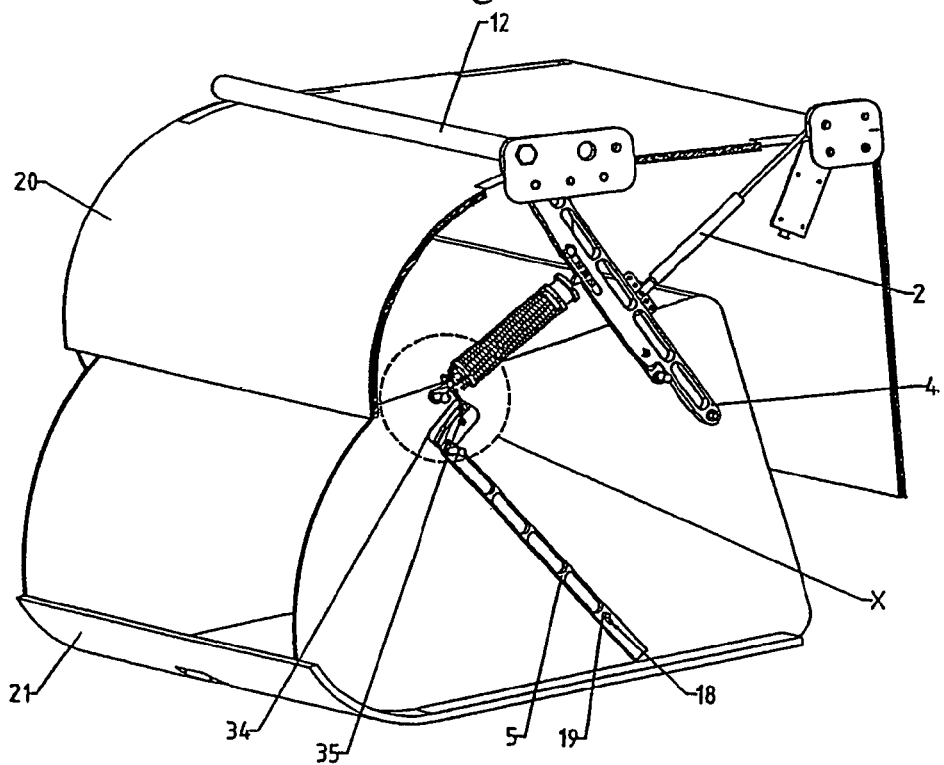
FIG. 9 shows the lowerable luggage stowage compartment of FIG. 8, in its opened position.
Figure 10:
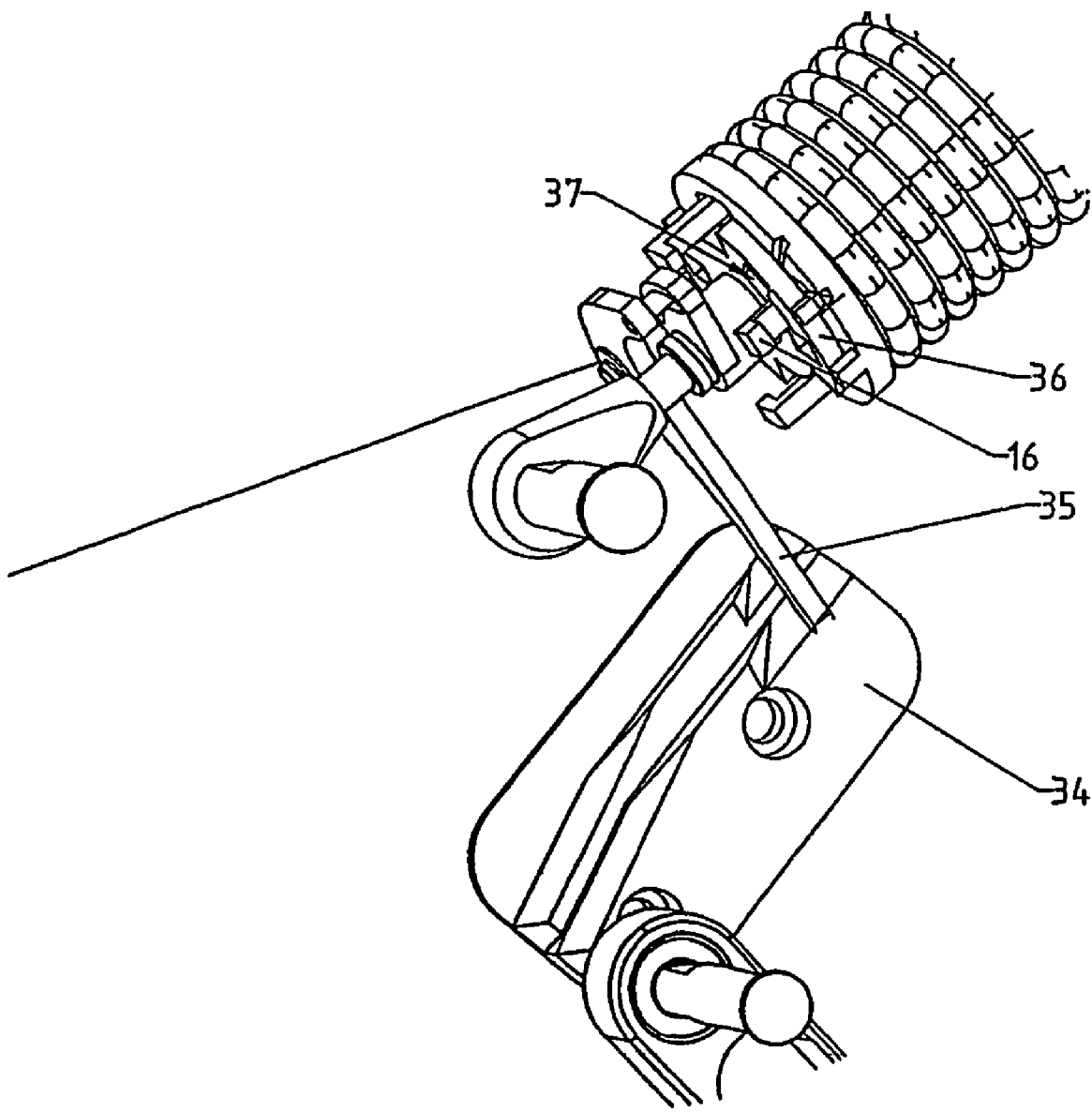
FIG. 10 shows the detail X of FIG. 9, in an enlarged view.

FIG. 10 shows the detail X according to FIG. 9 in an enlarged illustration. In accordance with the weight-caused change of the position of the compartment 21, the switching link 34 fastened to the side wall of the compartment 21 is moved, the direction of this movement being determined, e.g., by the guidance of the pin 18 in the long hole 19 in the lower guide rod 5. The end of the switching lever 35 rests on the switching link 34 and is pressed towards the switching link 34, preferably by a spring not illustrated, e.g. a torsion spring. A disk 36 is non-rotationally connected to the switching lever 35, which disk has appropriately configured recesses 37 via which, upon rotation of the disk 36, the at least one additional spring element 25 can be retained or released, and switching between the spring elements 1 and 25 may be effected, respectively. In the exemplary embodiment illustrated, this is achieved by a sleeve 16 arranged about the additional spring element 25, the projection of the sleeve 16 projecting through the recess 37 of the disk 36 and being retained or released at an appropriate angular position of the disk 36. The function of the spring element 1 in combination with the additional spring element 25 will be explained in more detail by way of FIGS. 11 to 13.

FIGS. 11A, 11B, and 11C show the embodiment in which the luggage compartment 21 is empty or only slightly loaded and thus will not be pressed downwards by the weight of its load. Thus, the switching lever 35 will be on the uppermost step of the switching link 34. In this angular position, the disk 36 which is non-rotationally connected to the switching lever 35 will release the sleeve 16 around the spring element 25 so that the latter can exert its force to assist in the movement of the compartment 21 into its closed position. This is effected by the end of the sleeve 16 which projects through the recess 37 in disk 36 being released, and being moved away from disk 36 by the spring force of spring 25. This can be recognized from the FIG. 11A sectional illustration of the spring elements 1, 25. The spring element 1 which is arranged coaxially relative to the spring element 25 is retained via connections to the plate 38 by the position of the disk 36 so that it cannot exert a pressure force. Taken all together, thus only the pressure force of the smaller spring element 25 will be effective.

Figure 12A:
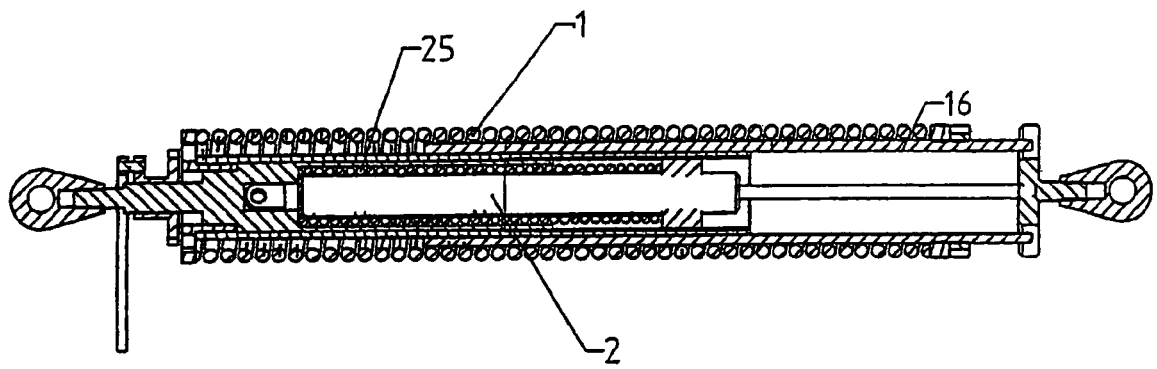
FIGS. 12A, 12B, and 12C show the spring element according to FIGS. 11A, 11B, and 11C, in a different switching position of the switching lever.
Figure 12B:
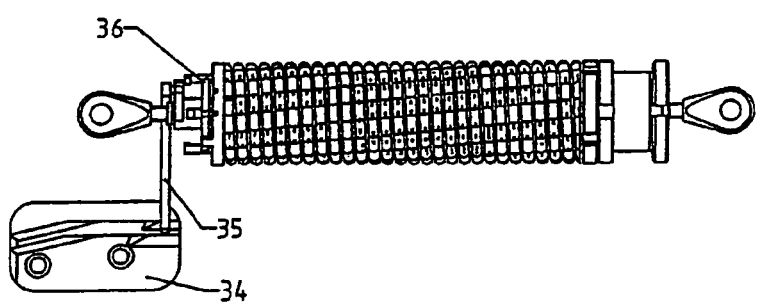
Figure 12C:
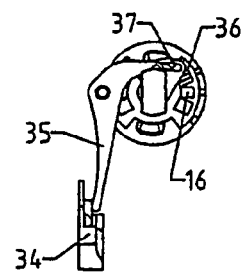

FIGS. 12A, 12B, and 12C show the case of a compartment 21 with an average load, the compartment being moved downwards in its position, contrary to the force of a measurement spring not illustrated. By this, also the switching link 34 carries out a corresponding movement so that the switching lever 35 will come to lie on the lower step of the switching link 34 (see FIGS. 12B and 12C) and by this will cause a rotational movement of the disk 36 connected to the switching lever 35. Due to this rotational movement of the disk 36 which, in the exemplary embodiment illustrated, is approximately 25° in clockwise direction, the sleeve 16 about the spring element 25 is held tightly so that the spring element 25 cannot exert any force. Instead, in accordance with the angular position of the disk 36, the spring element 1 will be released and can thus exert its force. In case of this average load of the compartment 21, thus, only the larger spring element 1 will be active.

Figure 13A:
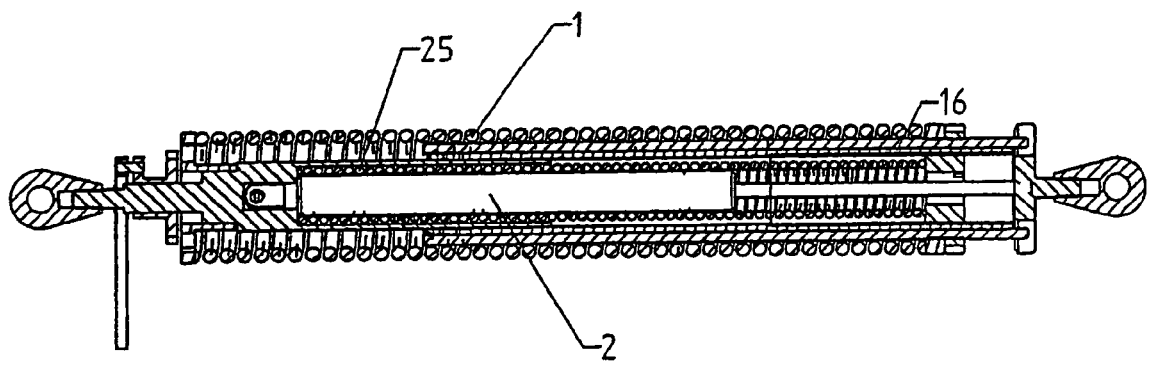
FIGS. 13A, 13B, and 13C show the spring element according to FIGS. 11A, 11B, and 11C in a further switching position, in which both spring elements are activated.
Figure 13B:
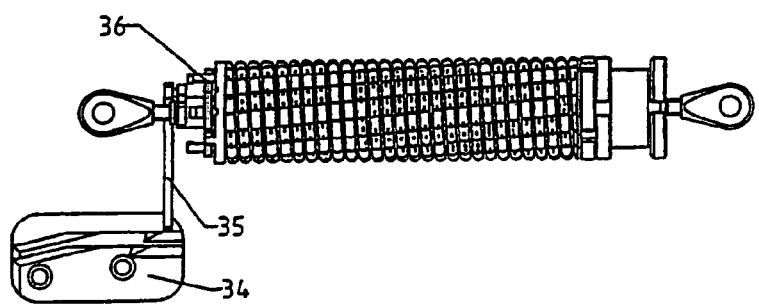
Figure 13C:
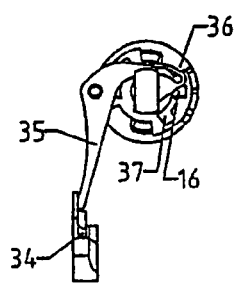

FIGS. 13A, 13B, and 13C show the state of a fully loaded compartment 21 in which the switching link 34 is moved for an even farther distance, so that the switching lever 35 will come to lie on the lowermost step of the switching link (see FIGS. 13B and 13C), so that the disk 36 will carry out a further rotational movement in clockwise direction. As compared to the position according to FIGS. 11A, 11B, and 11C, in the exemplary embodiment illustrated, the disk 36 has been rotated by about 50° in clockwise direction. In this position, corresponding recesses 37 are provided on disk 36 which will release both the sleeve 16 of the spring element 25 and the respective retention elements of the spring element 1 so that both spring elements 1, 25 can exert their force. In this fully loaded state of the compartment 21, thus, the full force will be unfolded to assist the closing movement. Of course, instead of the three-step construction illustrated in FIGS. 9 to 13A-13C, also a two-step or multi-step arrangement can be realized. It is also not important whether the spring element 1 is arranged about the spring element 25, or vice versa. Switching between the individual steps always can only be effected in the opened state of the compartment 21, in which all the retention devices of the spring elements 1 and 25 project through the openings 37 in disk 36 and, thus, a locking or release of the spring elements 1 or 25 is allowable.

Figure 14A:
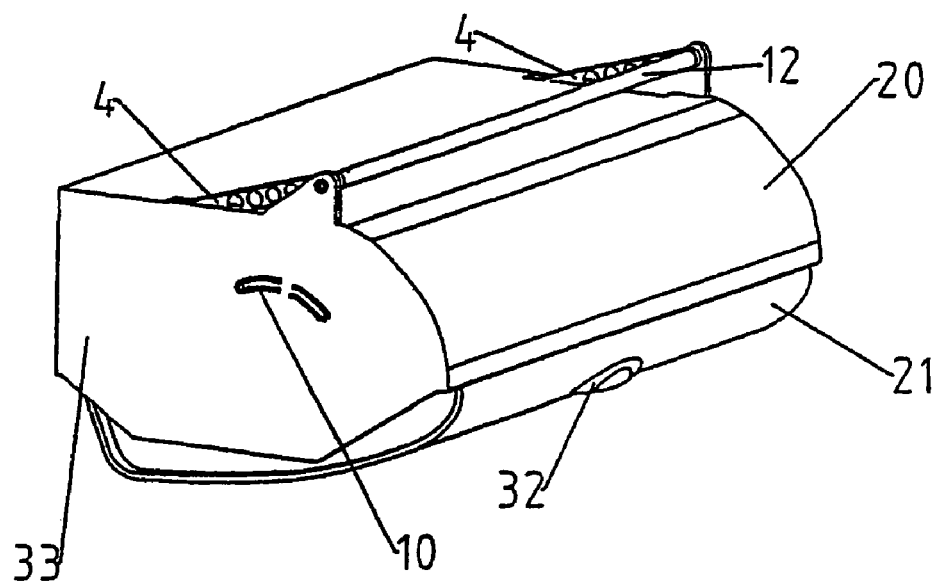
FIGS. 14A and 14B show a perspective view of a lowerable luggage stowage compartment according to the invention in closed (FIG. 14A) and opened (FIG. 14B) positions.
Figure 14B:
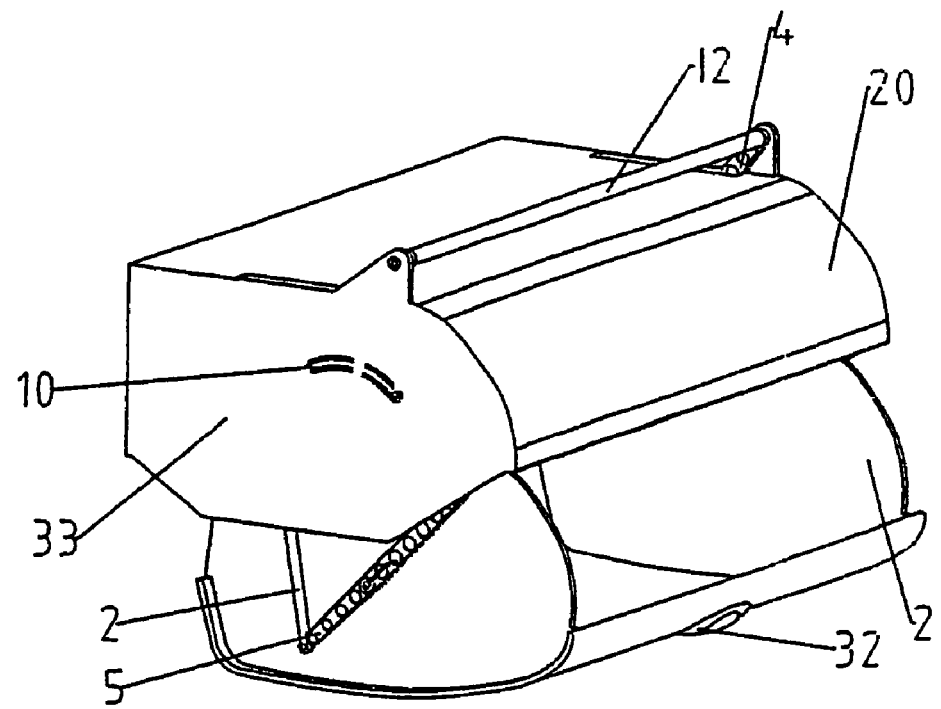

Finally, FIGS. 14A and 14B show the luggage stowage compartment 21 which has been provided with the suspension device according to the invention so as to make it lowerable. In FIG. 14A, the compartment 21 is shown in its closed position, in which it is pressed against the structural element 20 and fixed via a closing means 32. The suspension devices are arranged between a side wall 33 of the stationary structural element 20 and the side wall of the compartment 21. The upper guide rods 4 arranged on both sides are visible. To synchronize the lowering movement, the guide rods 4 are non-rotationally interconnected via a tube 12 or the like. FIG. 14B shows the lowered compartment 21, whereby the opening 23 for loading and unloading the compartment 21 with items of luggage is cleared. The lower guide rod 5 and a part of the damping element 2 are visible.

Because it is robust and maintenance-free, a purely mechanical solution is preferred. Yet it should be noted that also an electronic device for detecting the weight of the compartment 21 and also an electronic device for changing the spring force of the spring element 1 could be provided. However, for an electronic solution, a voltage supply is required, on the one hand, and wiring of the elements, on the other hand, with the consequence of an increased weight and also of increased maintenance and installation requirements. Furthermore, it should be noted that in principle, the most varying spring elements may be used, with coil springs, however, being preferred because they are simple and robust. Pneumatic spring cylinders have the disadvantage that they react to temperature changes and thus, the effect of their force is temperature-dependent which may be disadvantageous particularly in aircraft which are subjected to high temperature fluctuations. The elements of the suspension device illustrated may be made of light metal, such as aluminium or magnesium, or also of plastics, preferably of fiber-reinforced plastics.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A suspension device adapted to be used with a lowerable luggage stowage compartment comprising:
   at least one spring element that assists movement of the compartment into a closed position against a gravitational force when used therewith;
   at least one damping element that damps the movement of the compartment into an opened position when used therewith;
   a detector that detects a weight of the compartment when used therewith;
   at least one actuatable spring element that is actuated based on the detected weight of the compartment when used therewith; and
   a retention device that fixes a configuration of the actuatable spring element and that is actuated by the weight detector.

2. The device according to claim 1, wherein the spring element and the actuatable spring element are mechanical coil springs arranged coaxially to each other.

3. The device according to claim 1, wherein the actuatable spring element is surrounded by a sleeve that is fixable by the retention device so that the actuatable spring element is fixed when in a compressed position.

4. The device according to claim 1, wherein the retention device is a movable hook.

5. The device according to claim 1, wherein the retention device is a rotatably mounted disk adapted to rotate based on the detected weight of the compartment.

6. The device according to claim 5, wherein the disk is non-rotatably connected to a switching lever in operative contact with a switching link having at least two different switching positions corresponding to the detected weight of the compartment.

7. The device according to claim 6, wherein a spring presses the switching lever against the switching link.

8. The device according to claim 6, wherein the switching link has at least two snap-in steps each having a different step depth and is adapted to be displaced when the compartment is in the opened position.

9. The device according to claim 1, further comprising a measurement spring, wherein the detected weight is based on a deflection of the measurement spring when the compartment is in the opened position.

10. The device according to claim 9, further comprising a pin arranged in a long hole guide and adapted to connect both to the compartment and to one end of the measurement spring.

11. The device according to claim 10, further comprising a Bowden cable connected to the pin and to the retention device so that the retention device is releasable based on the detected weight.

12. The device according to claim 9, wherein the measurement spring is adjustable.

13. The device according to claim 1, further comprising a device that changes a spring force of the spring element, a spring force of the actuatable spring element, or a spring force of the spring element and the actuatable spring element.

14. The device according to claim 13, wherein the device that changes the spring force is a screw that changes spring bias.

15. The device according to claim 1, further comprising a device that maintains the compartment in the opened position when used therewith.

16. The device according to claim 15, wherein the maintaining device is a resiliently mounted sphere that engages in a corresponding snap-in depression when the compartment is in the opened position.

17. A lowerable luggage stowage compartment comprising the suspension device according to claim 1,
   wherein the spring element is arranged between the compartment and a stationary structural element located laterally of the compartment so as to assist in the movement of the compartment into the closed position, the damping element is configured to damp the movement of the compartment into the opened position, and the weight detector is connected to the compartment and to a device that changes a spring force of the spring element.

18. The compartment according to claim 17, further comprising on each side of the compartment at least one guide rod rotatably configured so as to be hinged to the stationary structural element, and a device that synchronizes the movement of the guide rods.

19. The compartment according to claim 18, wherein the synchronizing device is a tube that is non-rotatably connected to each of the guide rods.

20. The compartment according to claim 17, further comprising a second damping device that damps the movement of the compartment into the closed position.

* * * * *